(12) United States Patent
Freyermuth et al.

(10) Patent No.: US 8,474,831 B2
(45) Date of Patent: Jul. 2, 2013

(54) AXIALLY ADJUSTABLE TOOL HOLDER

(75) Inventors: Alain Freyermuth, Pfaffenhoffen (FR);
Willy Heyd, Dossenheim sur Zinsel (FR)

(73) Assignee: SECO-E.P.B., Bouxwiller (FR)

( * ) Notice: Subject to any disclaimer, the term of this patent is extended or adjusted under 35 U.S.C. 154(b) by 964 days.

(21) Appl. No.: 12/584,804

(22) Filed: Sep. 11, 2009

(65) Prior Publication Data

US 2010/0066037 A1   Mar. 18, 2010

(30) Foreign Application Priority Data

Sep. 12, 2008  (FR) ...................................... 08 56145

(51) Int. Cl.
   *B23B 31/11*   (2006.01)
(52) U.S. Cl.
   USPC .............................. 279/20; 279/99; 279/105.1
(58) Field of Classification Search
   USPC .......................................... 279/20, 99, 105.1
   IPC ......................................................... B23B 31/11
   See application file for complete search history.

(56) References Cited

U.S. PATENT DOCUMENTS

| | | | | |
|---|---|---|---|---|
| 1,253,149 A | * | 1/1918 | Childers | 285/114 |
| 1,477,931 A | * | 12/1923 | Bashara et al. | 175/393 |
| 1,973,943 A | * | 9/1934 | Buhr | 279/105.1 |
| 1,975,215 A | * | 10/1934 | Thomas | 279/105.1 |
| 2,078,192 A | * | 4/1937 | Buhr et al. | 279/105.1 |
| 2,182,411 A | * | 12/1939 | Rosenberg et al. | 279/105.1 |
| 2,849,902 A | * | 9/1958 | De Vlieg et al. | 408/181 |
| 2,990,188 A | | 6/1961 | Better et al. | |
| RE28,662 E | * | 12/1975 | Bilz et al. | 279/75 |
| 7,192,228 B2 | * | 3/2007 | Haenle et al. | 409/234 |
| 7,244,080 B2 | * | 7/2007 | Voss et al. | 408/57 |
| 7,500,811 B2 | * | 3/2009 | Pfob | 408/56 |
| 8,066,457 B2 | * | 11/2011 | Buettiker et al. | 409/234 |
| 2004/0084855 A1 | * | 5/2004 | Stenson | 279/53 |

FOREIGN PATENT DOCUMENTS

| | | |
|---|---|---|
| CA | 972943 A | 8/1975 |
| DE | 27 27 838 A1 | 12/1977 |
| DE | 3509161 A1 * | 9/1986 |
| FR | 1595136 A | 6/1970 |
| JP | 56003116 A * | 1/1981 |

* cited by examiner

*Primary Examiner* — Eric A Gates
(74) *Attorney, Agent, or Firm* — The Watson I.P. Group, PLC; Jovan N. Jovanovic; Vladan M. Vasiljevic

(57) ABSTRACT

An axially adjustable tool holder, having a principal body (1)with attachment, in a recess (2) of which is slidably mounted a mobile part (3) for mounting a tool (4). The mobile part (3) cooperates with a ring for transverse adjustment (5), mounted in rotation on the extremity of the principal body (1)with the recess (2) and secured transversely to said extremity, by a ball bearing device (8), in the form of a sleeve with an interior thread (5'). The ball bearing device (8) presenting axial play of the ring for transverse adjustment (5), when the mobile part (3) is tightened, application of the proximal face (51) of the adjustment ring (5)against a corresponding distal external supporting flange (1') of the principal body (1). The mobile part (3) being locked in working position, after adjustment, by a device for tightening (6) by traction cooperating with a part (7) of the mobile part (3).

11 Claims, 2 Drawing Sheets

AXIALLY ADJUSTABLE TOOL HOLDER

BACKGROUND OF THE DISCLOSURE

1. Field of the Disclosure

The present invention concerns the field of manufacture of one-piece modular tool holders or others used in multi-spindle, multi-post machines, for the precisely identical mounting of tools on such machines, and has as its object an axially adjustable tool holder.

2. Background Art

Axial adjustment of tools is generally done by means of adjustment sleeves mounted in the tool holders.

Tools used on multi-spindle machines machining identical parts at the same time require particularly precise axial adjustment of tools, in order to strictly respect the operations of the different parts, that is, milling, boring, dressing, peripheral milling, etc.

In such machines, each tool must be perfectly pre-adjusted in length and in a strictly identical manner from one spindle to another, that is, with the same precision.

For this purpose, FR-A-2 590 819 proposed such a device, essentially constituted by an attachment provided with a nose for mounting in machine spindles of the standard American taper, Morse taper, cylindrical shank type or others, and housing, in its extremity opposite the nose, a mobile part of the monobloc or modular type for reception of a tool. In this device, the housing for reception of the mobile part of the attachment is in the form of two bores of differing diameters, the larger of which extends from the face of the attachment and is connected to the smaller in the interior of said attachment, these bores presenting a length so as to permit longitudinal centering of the mobile piece. In addition, the attachment is provided at the level of the larger bore, on one hand with at least two screws for locking and adjustment of the mobile part cooperating with reversed, inclined, spherical grooves on the mobile part and, on the other, with at least one guiding element projecting into one of the bores and cooperating with a corresponding groove of the mobile part.

This device permits significant improvement in precision of mounting, but it is relatively complex, so that mounting and adjustment are relatively long, which involves equally significant preparation times, particularly for the equipping of multi-spindle and multi-post machines.

CA-A-972 943 also makes known a tool holder for drilling and counterboring which can be rapidly changed, in which the rapid change is made by means of ball bearings which can be positioned so as to release the tool by displacement of a sleeve, but which can in no case achieve a grip on the shank of the tool, as they do not permit sufficient rigidity of mounting.

In fact, such a grip on the shank of the tool by means of the ball bearings of the rapid-change device would be incompatible with a rigid mounting, because adjustment by the screw built into the cage housing the ball bearings would be impossible.

According to this document CA-A-972 943, no device is provided for tightening by traction which would cooperate with a corresponding part of a mobile part. In fact, the tightening screw of the sleeve support of the means of rapid change cannot serve to lock the mobile part after adjustment. This screw thus serves only to hold the support on which is mounted the sleeve permitting rapid mounting and dismounting, and this screw is not in any way designed to grip the shank of the tool, which would become impossible to dismount.

In addition, FR-A-1 595 136 describes an adjustment device in which a means for displacement of the tool on the tool holder is not connected in translation with the body of the tool holder, adjustment being possible only in one direction by a greater or lesser grip of this means on the shank of the tool. The necessary result is a less precise adjustment, especially due to the fact of the total independence of this means of displacement with regard to the tool holder.

SUMMARY OF THE DISCLOSURE

The present invention has as its object to overcome these problems by proposing an axially adjustable tool holder of simple composition and rapid installation.

For this purpose, the axially adjustable tool holder, which is essentially constituted by a principal body with attachment, in a recess of which is slidably mounted a mobile part for mounting a tool, is characterized in that the mobile part for mounting a tool cooperates with a ring for transverse adjustment, freely mounted in rotation on the extremity of the principal body including the recess for mounting said mobile part for mounting a tool, and secured transversely to said extremity, by means of a ball bearing device, and presented in the form of a sleeve provided with an interior thread, said ball bearing device presenting axial play guaranteeing, when the mobile part is tightened, application of the proximal face of the adjustment ring against a corresponding external supporting flange of the principal body, the mobile part being locked in working position, after adjustment, by means of at least one device for tightening by traction cooperating with a corresponding part of the mobile part.

BRIEF DESCRIPTION OF THE DRAWINGS

The invention will be better understood by means of the description below, which is related to a preferred mode of realization, given by way of non-limiting example and explained with reference to the attached schematic drawings, in which:

FIGS. 1 to 4 of the attached drawings represent an axially adjustable tool holder, which is essentially constituted by a principal body 1 with attachment, in a recess 2 of which is slidably mounted a mobile part 3 for mounting a tool 4.

DETAILED DESCRIPTION OF THE DRAWINGS

Figure 1:
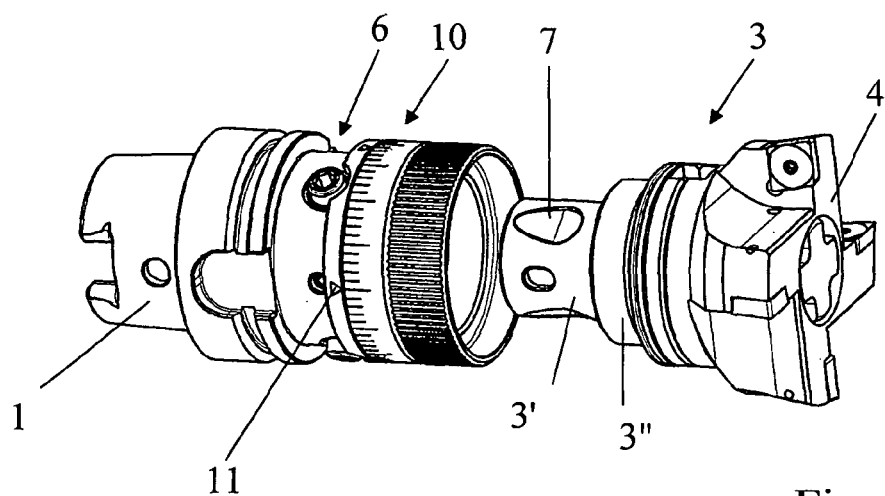
FIG. 1 is an exploded perspective view of a tool holder according to the invention.
Figure 2:
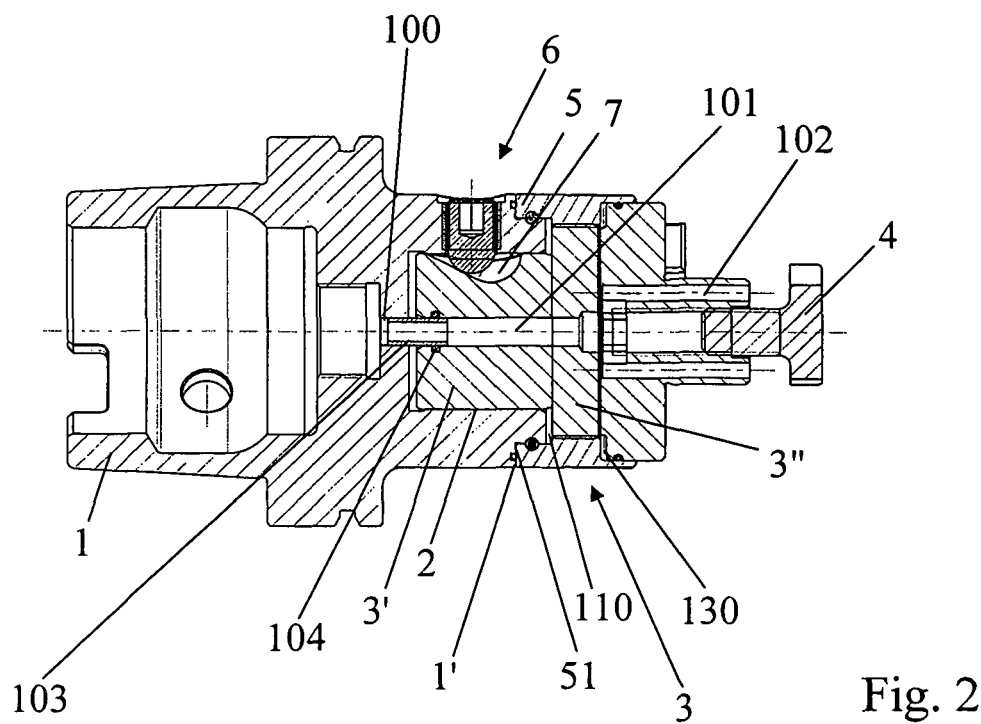
FIG. 2 is a sectional view of the tool holder in mounted position with cross section of the device for tightening by traction.

In accordance with the invention, the mobile part 3 for mounting a tool 4 cooperates with a ring for transverse adjustment 5, freely mounted in rotation on the extremity of the principal body 1 including the recess 2 for mounting said mobile part 3 for mounting a tool 4, and secured transversely to said extremity, by means of a ball bearing device 8, and presented in the form of a sleeve provided with an interior thread 5', said ball bearing device 8 presenting axial play guaranteeing, when the mobile part 3 is tightened, application of the proximal face 51 of the adjustment ring 5 against a corresponding distal external supporting flange 1' of the principal body 1, the mobile part 3 being locked in working position, after adjustment, by means of at least one device for tightening by traction 6 cooperating with a corresponding part 7 of the mobile part 3 (FIGS. 1 and 2).

Rotational guidance and transverse securing of the transverse adjustment ring 5 on the extremity of the principal body 1, by means of a ball bearing device 8, permit, by means of the operating play of said ball bearing device 8, when the mobile part 3 is tightened, sufficient displacement of the transverse adjustment ring 5 to apply its proximal face 51 against the corresponding distal external support flange of the principal body 1. The result is that adjustment of the tool can be done in a particularly precise manner, all play being eliminated when the mobile part 3 is tightened.

In addition, according to another characteristic of the invention, a peripheral gasket 9 is interposed between the proximal face 51 of the adjustment ring 5 and the corresponding external support flange 1' of the principal body 1. Thus a perfect seal is assured between the principal body 1 and the corresponding face of the adjustment ring 5, so that any leak of cutting liquid is prevented.

In addition, the transverse adjustment ring 5 is advantageously provided with a Vernier scale 10 cooperating with a corresponding index 11 provided on the principal body 1.

The mobile part 3, which presents a nose 3' for fitting into the recess 2 of the principal body 1 and which holds, at the opposite extremity, the tool 4, is provided with a threaded section 3" of a diameter corresponding to that of the interior threading 5' of the adjustment ring 5. In addition, the mobile part 3 presents, between the tool 4 and its threaded section 3", a flange 31 provided with a peripheral gasket 32, this flange being guided, in working position, into a corresponding counterbore 12 provided at the free extremity of the adjustment ring 5. Thus in the working position of the tool holder, the mobile part 3 is maintained in the recess 2 of the principal body 1, and thus in the principal body 1, by cooperation of the interior threading 5' of the ring 5 with the threaded section 3", the flange 31 penetrating into the counterbore 12 assuring, by means of the peripheral gasket 32, frontal sealing of the tool holder.

Figure 4:
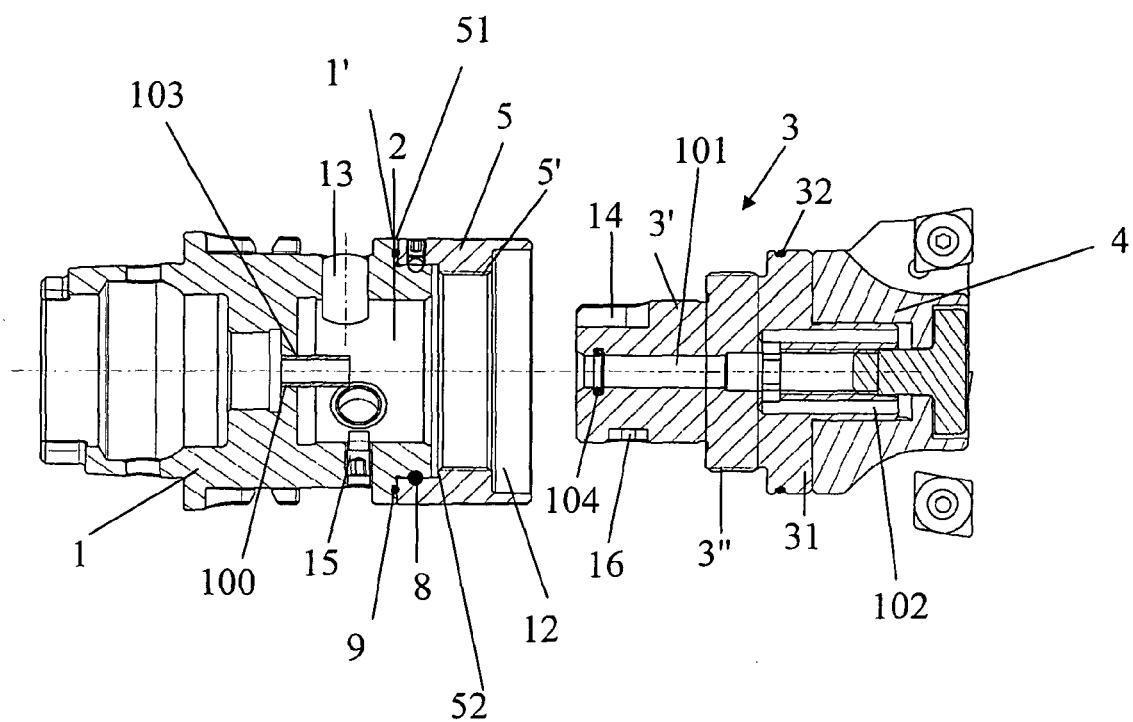
FIG. 4 is a larger-scale sectional view representing the tool holder in dismounted position in the orientation corresponding to that in FIG. 3.
Figure 3:
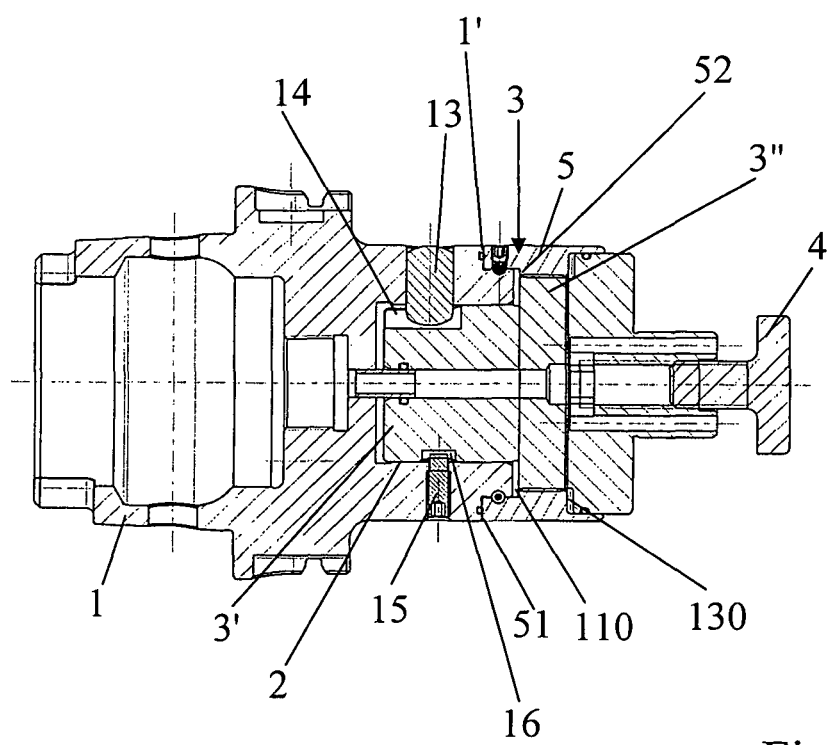
FIG. 3 is a sectional view analogous to that in FIG. 2, with cross section of the device for positioning in rotation and transverse guiding

According to another characteristic of the invention, and as shown particularly in FIGS. 3 and 4 of the attached drawings, the mobile part 3 is transversely guided and maintained in rotation by means of a radial pin 13 cooperating with a longitudinal groove 14 provided on a portion of the length of the nose 3' for fitting into the recess 2 of the principal body 1, a screw 15 traversing the wall of the recess 2, approximately opposite to the radial pin 13, cooperating with a closed groove 16 provided on said nose 3' to limit the course of the mobile part 3. Thus, the mobile part 3 can be perfectly positioned radially, with a freedom of axial displacement in the recess 2, with an eye to its definitive adjustment in position and its locking by tightening by means of the tightening device 6, the radial pin 13 being able to contribute, in addition, to its involvement in rotation.

The tightening device 6 (FIGS. 1 and 2) is preferentially presented in the form of at least one screw with a spherical tip radially traversing the wall of the recess 2 of the principal body 1 and cooperating with at least one corresponding part 7 of the mobile part 3. This part 7 of the mobile part 3 is advantageously in the form of an elongated recess, inclined starting from the free end of the nose 3' in the direction of the threaded portion 3" and ending in a half sphere.

Thus, when the spherical-tipped screw forming the tightening device 6 is tightened, it tends to progress toward the bottom of the recess forming the part 7 provided in the nose 3' of the mobile part 3, so that the latter tends to be drawn toward the bottom of recess 2 of the principal body 1 and all play between the adjustment ring 5 and the threaded portion 3" of the mobile part 3 is totally compensated, by reabsorption of the play of the ball bearing device 8. Preferentially, the device is provided with at least two tightening devices 6 angularly offset, in order to assure uniform tightening of the mobile part 3 in the principal body 1. Of course, it can also be provided with three devices 6 radially disposed, at regular intervals of 120° one from the other.

According to a characteristic of the invention, the adjustment ring 5 presents, on the side where it fits on the corresponding extremity of the principal body 1, an internal flange 52, set back with regard to its distal extremity 51 and delimiting, in mounted position on the principal body 1, with the corresponding face of the latter, longitudinal play 110, and the threaded portion 3" of the mobile part 3 presents a length equal at most to the length of the interior threading of the adjustment ring 5, the flange 31 prolonging this threaded portion 3" being offset with regard to the latter by a play 130 slightly less than that 110 provided between the internal flange of the adjustment ring 5 and the corresponding face of the principal body 1 (FIGS. 2 and 3).

The provision of these different plays prevents, whenever the position of the tool 4 is adjusted by means of the adjustment ring 5, the mobile part 3 from coming into bearing contact with its threaded portion 3" against the corresponding extremity of the principal body 1 on which said adjustment ring 5 is guided. Longitudinal adjustment of the tool 4 is thus practically possible over the greatest length of the threaded portion 3".

Tool holder devices of this type are generally provided, in a known manner, with means of lubrication of the cutting tool consisting in a central channel 100 traversing the principal body 1 and prolonged in the mobile part 3 by a central channel 101 to end at longitudinal, radial or other distribution channels 102 provided near the extremity of the mobile part 3 receiving the tool 4.

According to another characteristic of the invention, to assure a constant seal of the central channel 100 forming the means of lubrication between the principal body 1 and the central channel 101 of the mobile part 3, a connection tube 103 is advantageously provided, glued or banded in the part of the central channel 100 of the principal body 1 and guided in a watertight manner transversely in the central channel 101 of the mobile part 3 by means of a ring gasket 104. Thus whatever the adjusted position of the mobile part 3 and the tool with regard to the principal body 1, lubrication of the tool 4 is always assured along a perfectly watertight course.

The mounting of the mobile part 3 in the recess 2 of the principal body 1 is carried out by presenting its nose 3' in front of the recess 2, the longitudinal axis of the groove 14 of said nose 3' being in alignment with the axis of the radial pin 13. After insertion of the nose 3' in the recess 2 and abutting of the threaded portion 3" with the extremity of the interior threaded part of the adjustment ring 5, the latter is screwed onto said portion 3", so that the mobile part 3 is drawn toward the interior of recess 2. After additional penetration, corresponding to additional screwing of ring 5, the screw 15 is activated in order to bring its extremity into the closed groove 16 and thus to limit the course of the mobile part 3 and, as a result, any undesired withdrawal of the principal body 1.

Final adjustment of the position of the tool 4 can then be made very precisely by activating the adjustment ring 5; the displacement can be verified by reading the Vernier scale 10 provided on ring 5 in relation with the index 11.

Once the required position of tool 4 with relation to the principal body 1 is attained, this position can be locked by tightening the screw or screws forming the tightening device 6.

By means of the invention, it is possible to realize an axially adjustable tool holder, permitting particularly precise positioning of the tool and, in the case of the use of identical tools in relation with multi-spindle and/or multi-post machines, precisely identical tools.

Of course, the invention is not limited to the mode of realization described and represented in the attached drawings. Modifications remain possible, particularly from the point of view of the constitution of the diverse elements or by substitution of equivalent techniques, without thereby leaving the domain of protection of the invention.

What is claimed is:

1. Axially adjustable tool holder, essentially constituted by a principal body (1) with attachment, in a recess (2) of which is slidably mounted a mobile part (3) for mounting a tool (4), characterized in that the mobile part (3) for mounting a tool (4) cooperates with a ring for transverse adjustment (5), freely mounted in rotation on an extremity of the principal body (1) including the recess (2) for mounting said mobile part (3) for mounting a tool (4), and secured transversely to said extremity, by means of a ball bearing device (8), and presented in the form of a sleeve provided with an interior thread (5'), said ball bearing device (8) allowing axial play of said ring for transverse adjustment (5), when the mobile part (3) is tightened, which guarantees application of a proximal face (51) of the adjustment ring (5) against a corresponding distal external supporting flange (1') of the principal body (1), the mobile part (3) being locked in working position, after adjustment, by means of at least one device for tightening (6) by traction cooperating with a corresponding part (7) of the mobile part (3).

2. Tool holder, according to claim 1, characterized in that a peripheral gasket (9) is interposed between the proximal face (51) of the adjustment ring (5) and the corresponding external support flange (1') of the principal body (1).

3. Tool holder, according to claim 1, characterized in that the transverse adjustment ring (5) is provided with a Vernier scale (10) cooperating with a corresponding index (11) provided on the principal body (1).

4. Tool holder, according to claim 1, characterized in that the mobile part (3), which presents a nose (3') for fitting into the recess (2) of the principal body (1) and which holds, at the opposite extremity, the tool (4), is provided with a threaded section (3") of a diameter corresponding to that of the interior threading (5') of the adjustment ring (5).

5. Tool holder, according to claim 1, characterized in that the mobile part (3) presents, between the tool (4) and its threaded section (3"), a flange (31) provided with a peripheral gasket (32), this flange being guided, in working position, into a corresponding counterbore (12) provided at the free extremity of the adjustment ring (5).

6. Tool holder, according to claim 1, characterized in that the mobile part (3) is transversely guided and maintained in rotation by means of a radial pin (13) cooperating with a longitudinal groove (14) provided on a portion of the length of a nose (3') for fitting into the recess (2) of the principal body (1), a screw (15) traversing the wall of the recess (2), approximately opposite to the radial pin (13), cooperating with a closed groove (16) provided on said nose (3') to limit the course of the mobile part (3).

7. Tool holder, according to claim 1, characterized in that the tightening device (6) is presented in the form of at least one screw with a spherical tip radially traversing the wall of the recess (2) of the principal body (1) and cooperating with at least one corresponding part (7) of the mobile part (3).

8. Tool holder, according to claim 1, characterized in that part (7) of the mobile part (3) is in the form of an elongated recess, inclined starting from a free end of a nose (3') in the direction of the threaded portion (3").

9. Tool holder, according to claim 1, characterized in that it is provided with at least two tightening devices (6) angularly offset, in order to assure uniform tightening of the mobile part (3) in the principal body (1).

10. Tool holder, according to claim 1, characterized in that the adjustment ring (5) presents, on the side where it fits on the corresponding extremity of the principal body (1), an internal flange (52), set back with regard to its distal extremity (51) and delimiting, in mounted position on the principal body (1), with a corresponding face of the latter, a longitudinal play (110), and a threaded portion (3") of the mobile part (3) presents a length equal at most to the length of the interior threading of the adjustment ring (5), a flange (31) prolonging this threaded portion (3") being offset with regard to the latter by a play (130) slightly less than that (110) provided between the internal flange of the adjustment ring (5) and the corresponding face of the principal body (1).

11. Tool holder, according to claim 1, provided with means of lubrication of the cutting tool (4) consisting in a central channel (100) traversing the principal body (1) and prolonged in the mobile part (3) by a central channel (101) to end at longitudinal, radial or other distribution channels (102) provided near the extremity of the mobile part (3) receiving the tool (4), characterized in that it is provided with a connection tube (103), glued or banded in the part of the central channel (100) of the principal body (1) and guided in a watertight manner transversely in the central channel (101) of the mobile part (3) by means of a ring gasket (104).

\* \* \* \* \*